United States Patent [19]

Baer et al.

[11] Patent Number: 5,177,657
[45] Date of Patent: Jan. 5, 1993

[54] GROUND FAULT INTERRUPTOR CIRCUIT WITH ELECTRONIC LATCH

[75] Inventors: Mark Baer, Linden, Pa.; James M. Robitaille, Westlake, Ohio

[73] Assignee: Felchar Manufacturing Corporation, Kirkwood, N.Y.

[21] Appl. No.: 701,651

[22] Filed: May 16, 1991

[51] Int. Cl.$^5$ .............................................. H02H 3/16
[52] U.S. Cl. ........................................ 361/45; 361/42; 361/114
[58] Field of Search ....................... 361/45, 42, 44, 49, 361/114, 115

[56] References Cited

U.S. PATENT DOCUMENTS

| | | |
|---|---|---|
| Re. 33,087 | 10/1989 | Bradford et al. . |
| D. 269,341 | 6/1983 | Doyle et al. . |
| 3,614,533 | 10/1971 | Douglas .............. 317/18 D |
| 3,621,334 | 11/1971 | Burns et al. . |
| 3,786,466 | 1/1974 | Naito et al. . |
| 3,797,009 | 3/1974 | Brudgington, Jr. . |
| 3,800,215 | 3/1974 | Souillard . |
| 3,932,790 | 1/1976 | Muchnick . |
| 3,944,891 | 3/1976 | McDonald et al. . |
| 4,020,394 | 4/1977 | Potash . |
| 4,024,436 | 5/1977 | Adams . |
| 4,063,299 | 12/1977 | Munroe .................. 361/45 |
| 4,068,276 | 1/1978 | Pintell . |
| 4,081,851 | 3/1978 | Stevenson et al. . |
| 4,131,929 | 12/1978 | Moran . |
| 4,187,523 | 2/1980 | Gray . |
| 4,197,567 | 4/1980 | Dietz et al. .............. 361/45 |
| 4,208,621 | 6/1980 | Hipkins . |
| 4,288,694 | 9/1981 | Ahrons . |
| 4,320,433 | 3/1982 | Yamaki . |
| 4,326,103 | 4/1982 | Oehrig . |
| 4,331,149 | 5/1982 | Gonser . |
| 4,358,808 | 11/1982 | Praeg . |
| 4,358,809 | 11/1982 | Blok . |
| 4,370,630 | 1/1983 | Capek et al. . |
| 4,379,275 | 4/1983 | Kimball et al. . |
| 4,408,155 | 10/1983 | McBride . |
| 4,412,193 | 10/1983 | Bienwald et al. . |
| 4,466,071 | 8/1984 | Russell, Jr. . |
| 4,490,590 | 12/1984 | Matsuda . |
| 4,539,520 | 9/1985 | McBride . |
| 4,546,309 | 10/1985 | Kang et al. . |
| 4,550,286 | 10/1985 | Holland et al. . |

(List continued on next page.)

FOREIGN PATENT DOCUMENTS 2203907 3/1988 United Kingdom .

OTHER PUBLICATIONS

Raytheon Databook, *RV4145 Low Power Ground Fault Interrupter*, pp. 10-16 to 10-21.

*Primary Examiner*—Steven L. Stephan
*Assistant Examiner*—Matthew Nguyen
*Attorney, Agent, or Firm*—Marshall, O'Toole, Gerstein, Murray & Bicknell

[57] ABSTRACT

A ground fault interruptor circuit interrupts the flow of current to a pair of lines extending between a source of power and a load. The ground fault interruptor circuit includes a circuit breaker comprising a normally open switch located in one or both of the lines, a relay circuit for selectively closing the normally open switch, an electronic latch circuit operable in first and second bi-stable states and a fault sensing circuit for sensing the presence of a fault condition in at least one of the lines. The electronic latch circuit causes the relay circuit to close the normally open switch and maintain the normally open switch in its closed position when the electronic latch circuit is in the first bi-stable state. The electronic latch circuit also causes the relay circuit to permit the normally open switch to return to its normally open condition when the latch circuit is in its second bi-stable state. A fault sensing circuit senses the presence of a fault condition in at least one of the lines and causes the electronic latch circuit to latch in its second state upon detection of the fault condition.

14 Claims, 2 Drawing Sheets

U.S. PATENT DOCUMENTS

| | | |
|---|---|---|
| 4,567,456 | 1/1986 | Legatti . |
| 4,568,997 | 2/1986 | Bienwald et al. . |
| 4,574,324 | 3/1986 | Packard . |
| 4,591,941 | 5/1986 | Gruchalla et al. . |
| 4,595,894 | 6/1986 | Doyle et al. . |
| 4,598,331 | 7/1986 | Legatti . |
| 4,607,205 | 8/1986 | Kito et al. . |
| 4,635,040 | 1/1987 | Masot . |
| 4,638,175 | 1/1987 | Bradford et al. . |
| 4,658,213 | 4/1987 | Finley . |
| 4,710,751 | 12/1987 | Webster . |
| 4,731,576 | 3/1988 | Legatti . |
| 4,734,634 | 3/1988 | Kito et al. . |
| 4,737,769 | 4/1988 | Vila-Masot . |
| 4,739,274 | 4/1988 | Kimball et al. . |
| 4,760,285 | 7/1988 | Nelson . |
| 4,774,669 | 9/1988 | Schmitz et al. . |
| 4,816,957 | 3/1989 | Irvin ............ 361/45 |
| 4,837,519 | 6/1989 | Lopetrone et al. . |
| 4,868,704 | 9/1989 | Cavero . |
| 4,870,527 | 9/1989 | Zaleski . |
| 4,884,034 | 11/1989 | Guzman . |
| 4,896,089 | 1/1990 | Kliman et al. . |
| 4,896,242 | 1/1990 | Neft . |
| 4,929,901 | 5/1990 | Kimball et al. . |

GROUND FAULT INTERRUPTOR CIRCUIT WITH ELECTRONIC LATCH

BACKGROUND OF THE INVENTION

The present invention is directed towards a ground fault interruptor circuit and, more particularly, a ground fault interruptor circuit utilizing an electronic latching circuit Ground fault interruptor circuits interrupt the application of electric power to a load in response to an imbalance of a predetermined magnitude in the current flowing through the current-carrying wires connected between the source and the load. Typically, a ground fault interruptor circuit will use one or more differential transformers to monitor the current through the hot and neutral lines extending between a load and a source of power and will generate a fault signal whenever the imbalance between the currents in the hot and neutral lines exceeds a predetermined value. The fault signal is typically monitored by fault sensing circuits which control the operation of a relay which is coupled to a bi-stable mechanical switch or circuit breaker located in the hot and/or neutral lines. When the magnitude of the fault signal generated by the differential transformers exceeds a predetermined value, the fault sensing circuit applies power to the relay, thereby causing the bi-stable mechanical circuit breaker to open.

In a typical prior art device, a pair of bi-stable switches are coupled in the hot and neutral lines, respectively. The individual utilizing the ground fault interruptor circuit manually places the switches in the closed position, so as to apply power from the power source to the load.

When the differential transformer detects an imbalance in the current flowing through the hot and neutral lines (indicative of a ground fault or other circuit fault), the ground fault interruptor circuit energizes a relay which opens the switches in the lines. Since the switches are bi-stable mechanical switches, they remain in the open position until they are manually reset.

A primary drawback of these prior art ground fault interruptor circuits is that they use mechanical bi-stable switches which are relatively large, expensive and, due to their mechanical nature, somewhat unreliable.

It has recently become common to utilize ground fault interruptor circuits in connection with household appliances, such as wet/dry vacuums While the present invention is not limited to such uses, it exhibits particular advantages in connection with such uses.

When using a ground fault interruptor with a household appliance, it is preferable to house the ground fault interruptor in the plug holding the male prongs which fit into a standard female wall receptacle In such cases, it is important that the ground fault interruptor circuit be small, inexpensive, and highly reliable.

BRIEF DESCRIPTION OF THE PRESENT INVENTION

In accordance with the present invention, the bi-stable mechanical latch of the prior art is replaced with a bi-stable electronic latch which is used to energize a relay having at least one normally open switch.

To this end, the ground fault interruptor circuit of the present invention comprises:

a circuit breaker including the normally open switch located in one or both of a pair of lines extending between a source of power and a load;

a relay circuit for selectively closing the normally open switch;

an electronic latch circuit operable in first and second bi-stable states, the electronic latch circuit causing the relay to close the normally open switch and maintain the normally open switch in its closed position when the electronic latch circuit is in the first bi-stable state and causing the relay circuit to permit the normally open switch to return to its normally open condition when the latch circuit is in the second bi-stable state; and a fault sensing circuit for sensing the presence of a fault condition in at least one of the lines causing the electronic latch to latch in its second state upon detection of the fault condition.

In the preferred embodiment, the electronic latch circuit comprises a silicon controlled rectifier which is non-conducting when the electronic latch circuit is in the first state and is conducting when the electronic latch circuit is in the second state. The relay circuit preferably includes a magnetic relay and a transistor which controls the application of current to the magnetic relay When power is first applied to the ground fault interruptor circuit, the transistor is turned on and current flows through the relay closing the normally open switch. Initially, the silicon controlled rectifier is in its non-conductive state which permits the transistor to stay on.

When the fault sensing circuit detects a fault condition, it generates an output pulse which is applied to the gate of the silicon controlled rectifier, turning the rectifier on (placing it in its conductive state). Sufficient drive current continues to be applied to the silicon controlled rectifier to maintain it in its conductive state. When the silicon controlled rectifier is conductive, it removes base drive from the transistor, thereby cutting off current flow to the relay and permitting the normally open switch to open.

The silicon controlled rectifier continues to conduct (and the electronic latch circuit remains in its second bi-stable state) until the silicon controlled rectifier is manually reset In the preferred embodiment, a manually operable switch is connected across the anode and cathode of the silicon controlled rectifier and removes drive current from the silicon controlled rectifier when the switch is manually closed When the switch is released, the silicon controlled rectifier will remain off and base current will return to the relay transistor, thereby returning current flow through the relay and closing the normally open switch to permit power to return to the load.

BRIEF DESCRIPTION OF THE DRAWINGS

For the purpose of illustrating the invention, there is shown in the drawing a form which is presently preferred, it being understood, however, that the invention is not limited to the precise arrangement and instrumentality shown.

DETAILED DESCRIPTION OF THE PREFERRED EMBODIMENT

Figure 1:
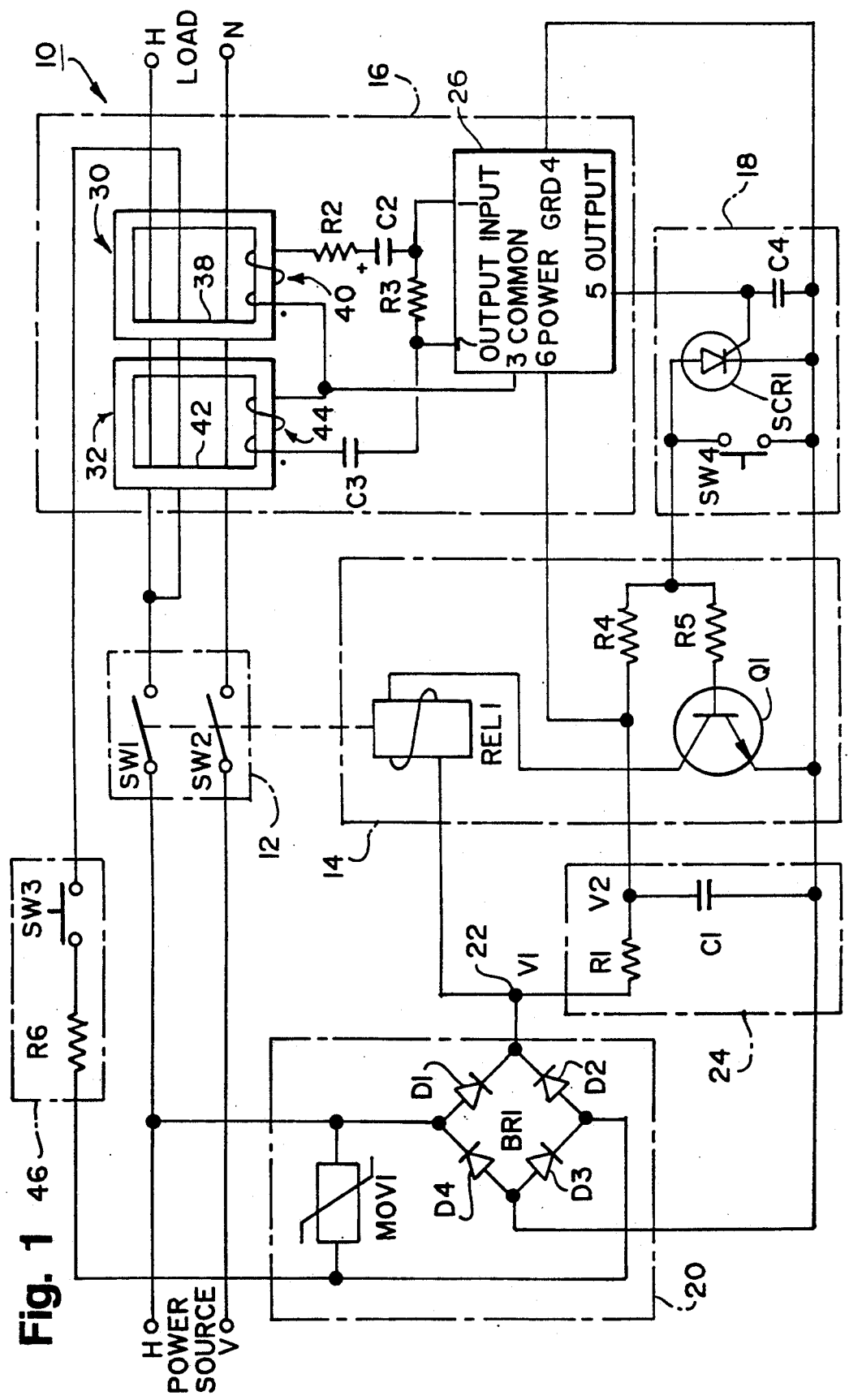
FIG. 1 is a circuit diagram of a ground fault interruptor circuit constructed in accordance with the principles of the present invention.

Referring now to the drawings wherein like numerals indicate like elements, there is shown in FIG. 1 a ground fault interruptor circuit constructed in accordance with the principles of the present invention and designated generally as 10. Ground fault interruptor circuit 10 includes a circuit breaker 12, a relay circuit 14, a fault detection circuit 16, a bi-stable electronic latch circuit 18, a power circuit 20, and a filter circuit 24.

Circuit breaker 12 includes a pair of normally open switches SW1 and SW2 located in the hot and neutral lines, respectively, extending between a power source and the load. While circuit breaker 12 can take any form desired, a preferred structure of the circuit breaker 12 is illustrated in copending application Ser. No. 07/701,130, entitled CIRCUIT BREAKER FOR USE IN WALL MOUNT PLUG, the disclosure of which is incorporated herein by reference.

Before power is applied to the ground fault interruptor circuit 10, switches SW1 and SW2 are in the normally open position. When power is applied to the hot and neutral lines (for example, when a plug having a ground fault interruptor circuit is coupled to a wall receptacle), the switches SW1 and SW2 are automatically closed by the interaction of relay circuit 14 and electronic latch circuit 18 and will remain held in the closed position until such time as the fault-detection circuit 16 detects the presence of a ground fault or a grounded neutral condition. When fault detection circuit 16 detects the presence of a fault, it generates an output which is applied to electronic latch circuit 18 which disables relay circuit 14, thereby permitting switches SW1, SW2 to return to their normally open position and cutting off power to the load.

In the preferred embodiment, the ground fault interruptor circuit 10 is powered directly by the hot and neutral lines it is monitoring To this end, a power circuit 20 converts the A/C signal appearing across the hot and neutral lines to a rectified D/C signal varying between 0 V and the maximum line voltage in a rectified sinusoidal manner. The power circuit 20 includes a diode bridge BR1 and a metal oxide varistor MOV1. The metal oxide varistor MOV1 is connected across the hot and neutral lines and protects against voltage spikes in the lines. The voltage across the varistor MOV1 is applied to the A/C terminals of the diode bridge BR1, which generates the rectified D/C voltage V1 across its D/C terminals.

The rectified D/C voltage V1 is applied directly to the relay circuit 14 and is applied to both the fault sensing circuit 16 and the latch circuit 18 via filter circuit 24.

The rectified D/C signal V1 appearing across the D/C terminals of bridge circuit BR1 is applied to a filter circuit 24, comprising resistor R1 and capacitor C1. The filter circuit 24 operates to smooth out the varying D/C voltage V1 and produce a modified D/C voltage V2 which never falls below the level required to continually drive silicon controlled rectifier SCR1 once it has been fired. This is described in further detail below.

Relay circuit 14 comprises a relay REL1 and a transistor Q1. As will be described in further detail below, transistor Q1 is initially turned on by the electronic latch circuit 18 when the A/C power is applied across the bridge circuit BR1. As a result, the rectified D/C current V1 is initially applied to the relay REL1 upon application of power to bridge circuit BR1 with the result that relay REL1 closes the normally open contacts SW1, SW2 of the circuit breaker 12.

The filtered D/C voltage V2 appearing across filter circuit 24 is applied directly to the power input terminal 6 of a low power ground fault interruptor integrated circuit (hereinafter "GFCI controller") 26 forming the heart of fault detection circuit 16. GFCI controller 26 is preferably an RV4145 low power ground fault interruptor circuit sold by Raytheon Corporation and described at pages 10–16 through 10–20 of Raytheon *Linear Integrated Circuits*, 1989, the description of which is incorporated herein by reference.

The filtered D/C voltage V2 is also applied to the base of transistor Q1 via current-limiting resistors R4 and R5 whenever electronic latch circuit 18 is latched in the off position (i.e. when rectifier SCR1 is off). When electronic latch circuit 18 is latched in the off state, the current through resistors R4 and R5 provides base drive to transistor Q1 and turns transistor Q1 on. When transistor Q1 is on, current flows through the relay REL1, thereby closing contacts SW1 and SW2 of circuit breaker 12. Whenever electronic latch circuit 18 is latched in the on state (i.e. when rectifier SCR1 is conducting), rectifier SCR1 removes base drive from transistor Q1 and turns transistor Q1 off. In this condition, current will not flow through relay REL1 and switches SW1 and SW2 return to their normally open position.

Figure 2:
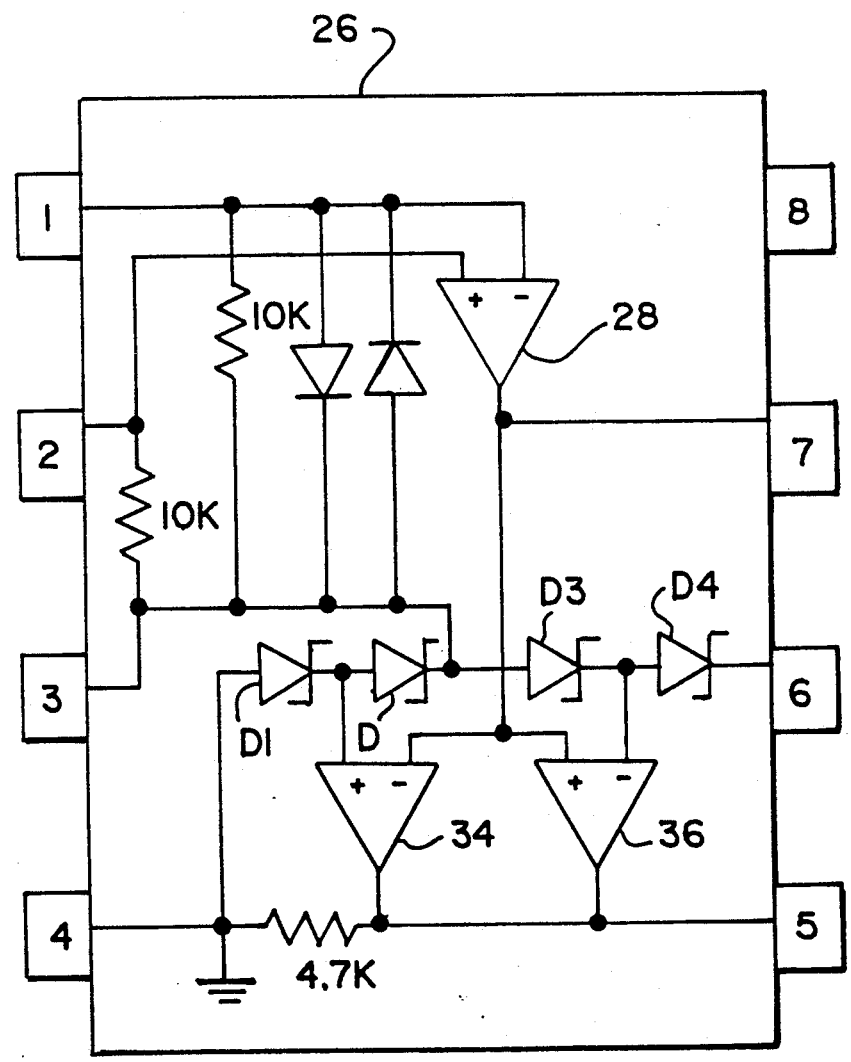
FIG. 2 is a schematic diagram of the integrated circuit forming part of the circuit of FIG. 1.

As stated above, the filtered D/C voltage V2 appearing at the output of filter circuit 24 is applied to the power pin 6 of GFCI controller 26. A functional block diagram of GFCI controller 26 is illustrated in FIG. 2.

As shown therein, GFCI controller 26 includes a first operational amplifier 28 which amplifies the fault signal generated by sense coil 30 as applied to the input pin 1 of GFCI controller 26 The gain of the operation of amplifier 28 is determined by the feedback resistor R3 (FIG. 1) extending between pin 7 and 1.

The amplified fault signal appearing at the output of operational amplifier 28 is applied to the inverting and noninverting input terminals of operational amplifiers 34 and 36, respectively. These operational amplifiers operate as comparators which compare the output voltage of operational amplifier 28 to preset voltages generated by the Zener diodes D1-D4. When the magnitude of the fault signal applied to input pin 1 of GFCI controller 26 rises above a predetermined level, the appropriate operational amplifier 34, 36 generates an output pulse on pin 5. The output pulse on pin 5 is applied to the gate of silicon-controlled rectifier SCR1, thereby firing the rectifier. A capacitor C4 is coupled to the gate of rectifier SCR1 to prevent the rectifier from firing as a result of noise in the circuit.

When the rectifier SCR1 is fired, it turns on and removes base current from transistor Q1, thereby turning transistor Q1 off. When transistor Q1 is turned off, current is removed from the relay REL1 and the normally open contacts SW1 and SW2 of circuit breaker 12 return to the normally open position. This removes power from the load, thereby providing the desired fault protection.

As discussed above, the filter circuit 24 modifies the D/C output of bridge circuit BR1 to generate a filtered D/C voltage V2 which does not fall below the level required to keep rectifier SCR1 conducting once it has been turned on by the application of a drive pulse to its gate. As a result, rectifier SCR1 continues to conduct and will remain latched in its conductive state until the rectifier SCR1 is reset either through the removal of power from the hot and neutral lines, or as a result of the manual depression of reset switch SW4. When reset switch SW4 is depressed, drive current is removed from the anode of rectifier SCR1 and the rectifier will turn off. While the switch SW4 is depressed, base drive will continue to be removed from transistor Q1. Once reset switch SW4 is released, base drive returns to transistor Q1, thereby returning current flow to relay REL1 and again closing the normally open contacts SW1 and SW2 of circuit breaker 12 This returns power to the load.

If the fault condition no longer exists, contacts SW1 and SW2 will be maintained in the closed position by relay REL1 and power will be applied to the load. If, however, a fault condition still exists, it will be detected by fault detection circuit 16 with the result that GFCI controller 26 will generate a new output pulse on its output pin 5, thereby refiring rectifier SCR1, disabling power to relay circuit 14 and permitting contacts SW1 and SW2 to return to their normally open position.

In the preferred embodiment, fault detection circuit 16 detects two types of faults: (1) faults which result in a differential in the currents in the hot and neutral line which exceed a predetermined value (such a fault might typically result from a grounding of the hot line) and (2) a grounded neutral fault.

The first type of fault is detected by the sense coil 30 which includes a laminated core 38 and a multiturn sense winding 40. A single turn of the hot and neutral lines passes through the laminated core 38. Any differential in the currents passing through the hot and neutral lines (which under normal conditions are of equal but opposite magnitudes), will generate an induced voltage in the sense windings 40. This induced voltage is applied to the pin 1 of GFCI controller 26 and thereby to the inverting input terminal of operational amplifier 28 (FIG. 2). This fault signal is amplified by amplifier 28 and will cause one of the operational amplifiers 34, 36 to generate an output pulse, thereby firing rectifier SCR1, if the magnitude of the fault signal exceeds a predetermined value.

Grounded neutral conditions are sensed by the combined effect of sense coil 30, feedback coil 32, and a single turn coil formed by a grounded neutral condition. Feedback coil 32 includes a ferrite core 42 and a multiturn feedback winding 44. Like sense coil 30, a single turn of the hot and neutral leads pass through the ferrite core 44 In the event of a grounded neutral condition, the current through the hot and neutral lines may be substantially equal with the result that sense coil 30 will not generate a differential voltage significantly high enough to cause either of the operational amplifiers 34 or 36 to generate an output pulse. A grounded neutral condition is, nonetheless, a dangerous condition. When a grounded neutral condition occurs, a magnetic path will be closed between the two coils 30, 32 by the short or fault causing the grounded neutral condition. This results in an A/C coupling between the three coils (the sense coil 30, feedback coil 32, and the coil formed by the short or fault condition which defines a single-turn path between the sense coil 30, and the feedback coil 32) which forms a positive feedback path around the operational amplifier 28 (FIG. 2). As a result, the operational amplifier 28 begins to oscillate at a frequency determined by the value of resistor R3 and the capacitor C3. When the peak of the oscillation voltage exceeds the thresholds defined by Zener diodes D1-D4, the appropriate operational amplifier 34, 36 will fire generating an output pulse which is supplied to the gate of the rectifier SCR1.

The sensitivity of the fault detection circuit 16 to grounded neutral faults is adjusted by changing the frequency of oscillation of the feedback circuit which in turn is adjusted by adjusting the value of resistor R3 and capacitor C3. Increasing the frequency reduces the sensitivity by reducing the loop gain of the positive feedback circuit. As frequency increases, the signal becomes attenuated by C3 and the loop gain decreases.

In order to ensure that the fault interruptor circuit is operating properly, a test circuit 46 is provided. Test circuit 46 includes a normally open switch SW3 and a current-limiting resistor R6. When switch SW3 is depressed, the current moving from left to right through the sense coil 30 increases relative to the current moving through the neutral line N, causing an imbalance in the sense coil. This imbalance is detected by GFCI controller 26 generating an output pulse which fires rectifier SCR1 causing the contacts SW1 and SW2 of the circuit breaker 12 to open.

In the presently-preferred embodiment, the transistor Q1 is an MPSA42 and the rectifier SCR1 is an EC103D. The values of the resistors and capacitors shown are as follows:

| Component | Value |
| --- | --- |
| R1 | 24 KΩ |
| R2 | 150 Ω |
| R3 | 1.1 MΩ |
| R4 | 5.1 KΩ |
| R5 | 39 KΩ |
| C1 | 1 μf |
| C2 | 15 μf |
| C3 | .0068 μf |
| C4 | 6.8 μf |

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A ground fault interruptor circuit for interrupting the flow of current through a pair of lines extending between a source of power and a load, said ground fault interruptor circuit comprising:

a circuit breaker including a normally open switch located in one of said lines;

a relay circuit for selectively closing said normally open switch;

an electronic latch circuit operable in first and second bi-stable states, said electronic latch circuit causing said relay circuit to automatically close said normally open switch upon application of power to said lines and maintain said normally open switch in its closed position when said electronic latch circuit is in said first bi-stable state and causing said relay circuit to permit said normally open switch to return to its normally open condition when said latch circuit is in said second bi-stable state, said electronic latch being initially placed in said first bi-stable state when power is applied to said lines; and a fault sensing circuit for sensing the presence of a fault condition in at least one of said lines and for causing said electronic latch circuit to latch in its second bi-stable state upon detection of said fault condition.

2. The ground fault interruptor circuit of claim 1, further including means for manually resetting said latch circuit into said first bi-stable state after it has been placed in said second bi-stable state by said fault sensing circuit.

3. The ground fault interruptor circuit of claim 1, wherein said electronic latch circuit comprises a silicon controlled rectifier which is non-conducting when said electronic latch circuit is in said first state and is conducting when said electronic latch circuit is in said second state.

4. The ground fault interruptor circuit of claim 3 wherein said fault sensing circuit causes said rectifier to turn on when said fault sensing circuit detects said fault condition by applying a firing pulse to a gate input of said rectifier.

5. The ground fault interruptor circuit of claim 4, further including means for maintaining drive current through said rectifier after said rectifier has been turned on by said fault sensing circuit.

6. The ground fault interruptor circuit of claim 5, wherein said means for maintaining drive current comprises a power circuit for converting an A/C line voltage applied across said lines to a rectified varying D/C voltage and a filter means for filtering said rectified varying D/C voltage to a sufficient degree that drive current will be available to said rectifier once said rectifier is turned on throughout the entire A/C cycle of said A/C line voltage.

7. The ground fault interruptor circuit of claim 6, wherein said means for manually resetting said electronic latch circuit comprises means for removing drive current from said rectifier in response to the manual actuation of said resetting means.

8. The ground fault interruptor circuit of claim 7, wherein said manually resetting means comprises a human actuable switch for shorting out said rectifier once said switch is manually closed.

9. The ground fault interruptor circuit of claim 4, wherein said fault sensing circuit senses both ground faults and grounded neutral faults and causes said electronic latch circuit to latch in said second position upon the detection of either of said faults.

10. The ground fault interruptor circuit of claim 4, wherein said relay circuit comprises a relay which is magnetically coupled to said normally open switch and an electronic switch for selectively applying power to said relay, said relay closing said normally open switch when power is applied to said relay.

11. The ground fault interruptor circuit of claim 10, wherein said normally open switch is closed only when power is applied to said relay.

12. The ground fault interruptor circuit of claim 11, wherein said electronic latch circuit controls the operation of said electronic switch.

13. The ground fault interruptor circuit of claim 12, wherein said electronic switch is a transistor.

14. The ground fault interruptor circuit of claim 1, wherein said relay circuit permits said normally open switch to reopen upon the detection of a fault in said lines by said fault sensing circuit.

* * * * *